Sept. 6, 1955
H. GROUNDS
ROOT SEPARATOR
2,716,932
Filed Dec. 29, 1952
2 Sheets-Sheet 1
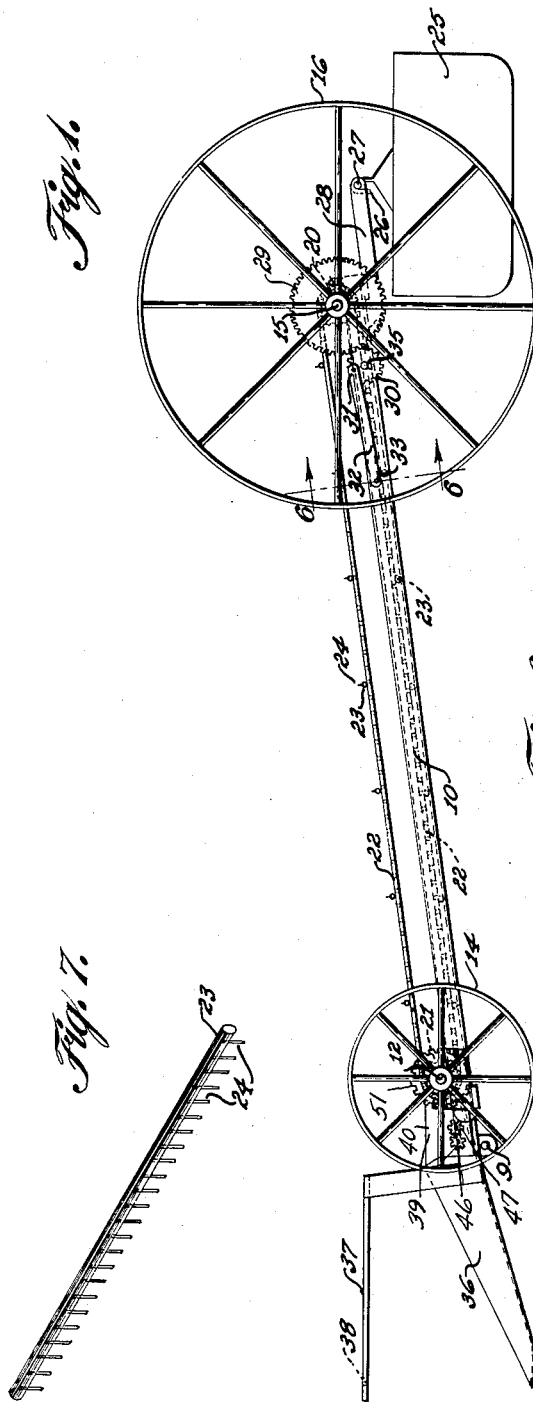
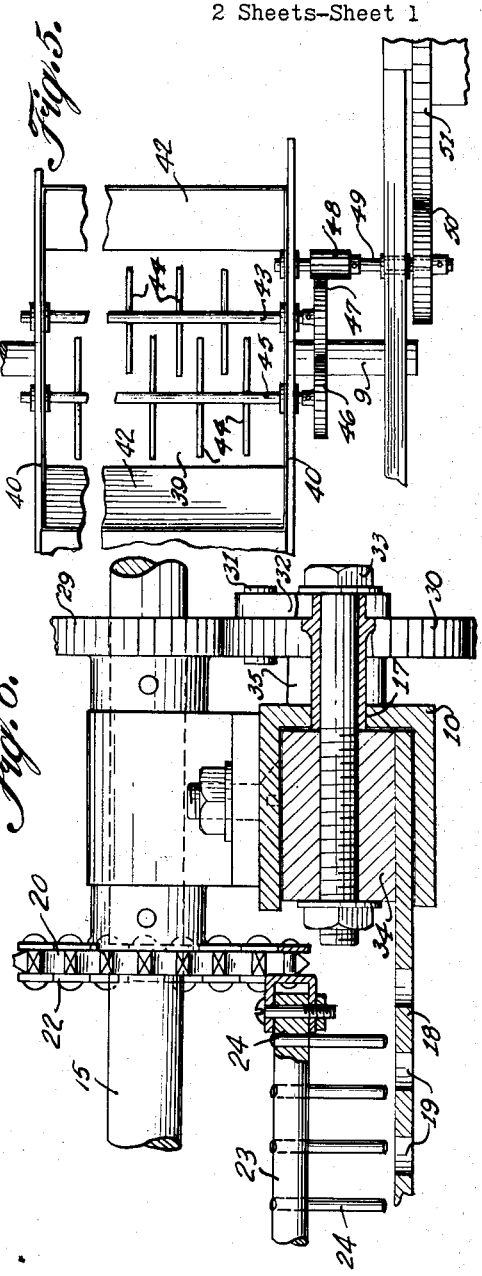
INVENTOR.
*Henry Grounds*
BY *Victor J. Evans & Co.*
ATTORNEYS

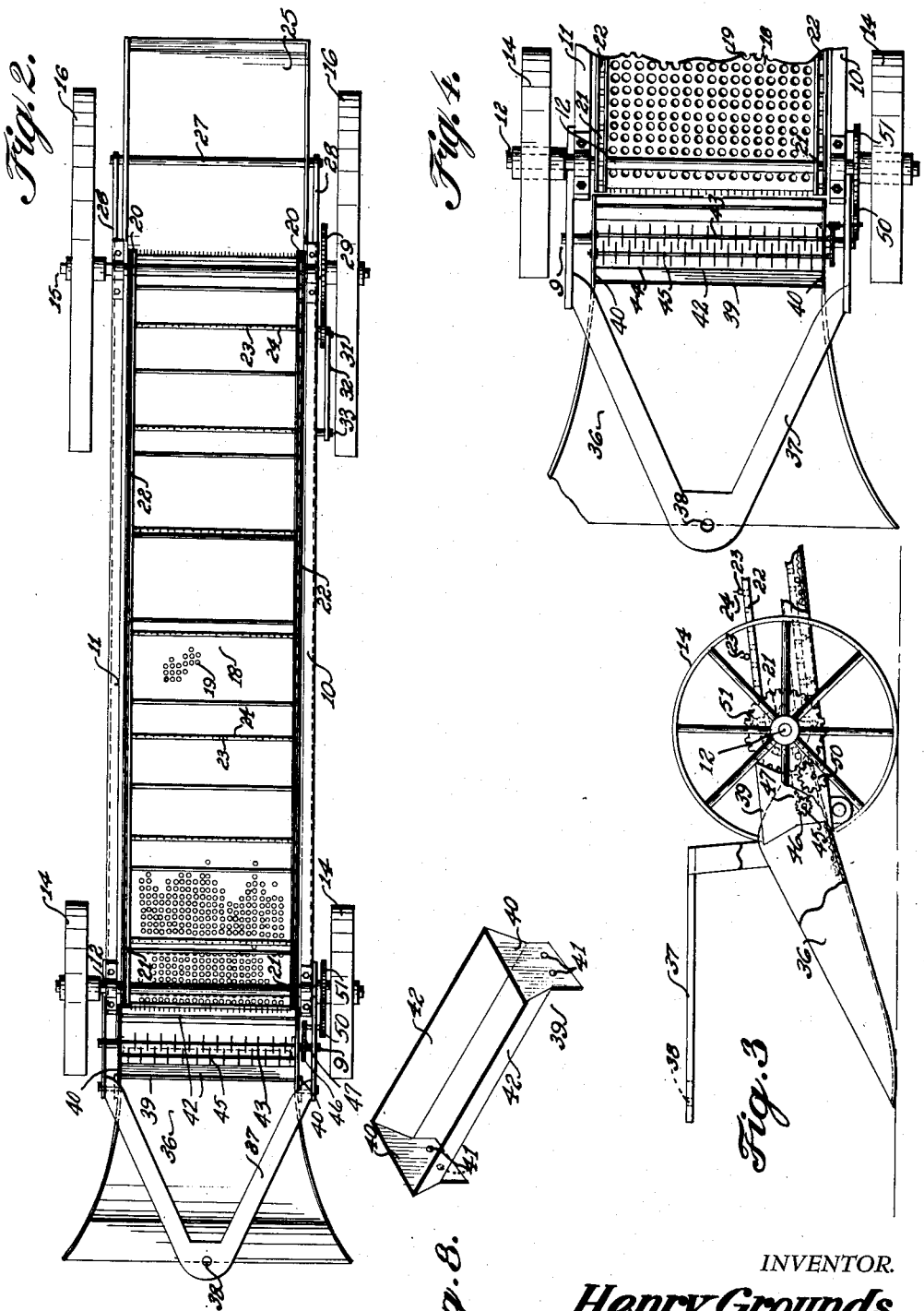

United States Patent Office 2,716,932
Patented Sept. 6, 1955

2,716,932
ROOT SEPARATOR
Henry Grounds, Dallas, Tex.

Application December 29, 1952, Serial No. 328,461

3 Claims. (Cl. 97—10)

This invention relates to agricultural equipment, and more particularly to a machine for separating roots from soil.

The object of the invention to provide a root separating machine which will automatically separate the roots of different plants from the soil.

Another object of the invention is to provide a root separator which includes a scraper or plow on its front end for elevating the dirt or soil and roots onto a reciprocating perforated platform, there being a mechanism for carrying the roots rearwardly along the platform for deposit in a container, the soil or dirt passing downwardly through the perforations in the platform.

A further object of the invention is to provide a root separator which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a side elevational view of the root separator, constructed according to the present invention.

Figure 2 is a top plan view of the root separator of the present invention.

Figure 3 is a fragmentary side elevational view of the front end of the root separator, with parts broken away and in section.

Figure 4 is a fragmentary top plan view of the front portion of the present invention.

Figure 5 is an enlarged fragmentary top plan view showing the front of the root separator.

Figure 6 is an enlarged sectional view taken on the line 6—6 of Figure 1.

Figure 7 is a perspective view of one of the bars.

Figure 8 is a perspective view of the hopper.

Referring in detail to the drawings, the numerals 10 and 11 designate a pair of channel shaped beams which are U-shaped in cross section and which form part of a frame. A front axle 12 is journaled on the beams 10 and 11, and front wheels 14 are mounted on the axle 12.

There is also journaled between the beams 10 and 11 a rear axle 15 which has wheels 16 mounted thereon. The wheels 16 are of greater diameter than the wheels 14 so that the front portion of the frame is lower than the rear portion thereof. The beam 10 is provided with a slot 17, Figure 6, adjacent its rear end for a purpose to be later described.

Mounted on the rear axle 15 is a pair of sprockets 20, while mounted on the front axle 12 is a similar pair of sprockets 21. Endless chains 22 are trained over the sprockets 20 and 21. Slidably or reciprocably supported by the beams 10 and 11 is a platform or plate 18 which is provided with a plurality of perforations or holes 19 through which dirt or soil free from roots is adapted to pass. The endless chains 22 travel over the platform 18. Extending between the pair of chains 22 and secured thereto is a plurality of spaced parallel bars 23, and each of the bars 23 has a plurality of fingers 24 projecting therefrom. Thus, as the machine of the present invention is pulled forwardly the axles will cause the sprockets and chains 22 to travel over the platform 18 whereby the fingers 24 on the bars 23 will be constantly moving the soil and roots rearwardly along the reciprocating platform 18. Thus, as the dirt is worked loose from the roots, the dirt will pass downwardly through the openings 19. The roots which have been separated from the soil are adapted to be received or collected in a suitable container 25 which may be suspended by hooks 26 on a shaft 27 which extends between arms 28. The arms 28 may be secured to the rear ends of the beams 10 and 11.

A means is provided for constantly reciprocating or sliding the platform 18 back and forth in the frame so as to facilitate the separation of the roots and dirt. This means comprises a large gear wheel 29 which is mounted on the rear axle 15, and the gear wheel 29 is arranged in meshing engagement with a gear wheel 30 which is mounted on a stub shaft 35. An eccentric pin 31 serves to pivotally connect one end of a link 32 to the gear wheel 30, and a suitable securing element such as a bolt and nut assembly 33 serves to pivotally connect the other or forward end of the link 32 to a block 34. The securing element 33 extends through the slot 17 in the beam 10, Figure 6, and the block 34 is secured to the platform 18 in any suitable manner, as for example by welding.

Arranged on the front end of the frame and extending downwardly therefrom is a plow or scraper 36 which is adapted to scoop up the soil and roots which are to be separated. A hitch 37 is connected to the front of the machine whereby the machine can be readily attached to a towing vehicle, as for example a tractor, and a suitable opening 38 is arranged in the hitch 37 for the reception of an attaching pin.

Mounted on the front end of the machine of the present invention is a hopper which is indicated generally by the numeral 39, Figure 8. The hopper 39 includes spaced parallel end walls 40 which are provided with openings 41 therein for the projection therethrough of a pair of shafts 43 and 45. The hopper 39 further includes a pair of side walls 42, and it will be noted from Figure 8 that the side walls 42 do not extend all the way down the length of the end walls 40. Also, there is no bottom in the hopper 39 so that the material passing through the hopper 39 can be worked upon by blades 44 which are secured to the shafts 43 and 45 whereby hard dirt and the like will be broken up into smaller pieces. It will be seen that the teeth or fingers 44 on one shaft 43 are arranged in staggered relation with respect to the teeth 44 on the other shaft 45. For causing rotation of these shafts, a gear 46 is arranged on an end of the shaft 45 and the gear 46 meshes with a gear 47 on the shaft 43. A shaft 49 has a gear 48 thereon meshing with the gear 47, and the shaft 49 also has a gear 50 thereon. Mounted on the axle 12 is a gear 51 which meshes with the gear 50 so that as the machine moves forwardly the intermeshing gears will cause rotation of the shafts 43 and 45.

In use, the root separator of the present invention may be pulled along by a suitable towing vehicle, as for example a tractor attached to the hitch 37. As the machine is pulled along the field, the roots and soil will be scraped up by the plow 36 and deposited in the hopper 39, and the material passing through the hopper 39 will be broken up somewhat by the rotating teeth 44 on the shafts 43 and 45. From the hopper 39, the soil and roots are deposited on the reciprocating platform 18, and the moving bars 23 having the fingers 24 thereon will carry the roots and soil rearwardly along the reciprocating platform 18. The soil or dirt will drop down through the openings 19, and the separated roots will be carried rearwardly and deposited in the container 25.

The root separator of the present invention will separate roots of different plants from the soil, and the scraper or plow 36 on the front of the separator will elevate the dirt and roots and drop this material on the platform 18. The platform 18 is constantly being shaken so that the dirt will pass downwardly through the holes 19 while the roots will be carried to the container 25 on the rear end of the machine. The roots which are left on the platform 18 after the dirt has sifted through the holes 19 will be carried to the rear by the fingers 24 on the bars 23 which are attached to the endless chains. Although the drawing shows the rear end of the machine to be higher than the front end, it is to be understood that the separator could be constructed so that the platform is level, or else the front end could be higher than the rear end. Further, a suitable auger or elevator can be used in conjunction with the scoop 36 for elevating the material to the platform and such an auger could be powered by the tractor which pulls the separator. Further, the hopper 39 is detachably mounted on the machine and is adapted to be used in the event that the soil is especially hard. Other means beside the gears shown could be used for rotating the teeth in the hopper 39. Also, a sheer pin can be provided in the event that rocks become lodged in the knives or teeth.

The scoop 36 is pivotally mounted on a shaft 9 so that it can swing about a horizontal axis.

I claim:

1. A root separator comprising an inclined frame including a first and second spaced parallel beam each having a U-shaped cross section, spaced parallel front and rear axles journaled on said frame, front and rear ground-engaging wheels mounted on said axles, a platform reciprocably supported by said beams and provided with a plurality of spaced perforations, an inclined scraper extending downwardly from the front end of said frame, there being a slot in said first beam, a block secured to said platform and arranged contiguous to said slot, a securing element extending through said slot and connected to said block, a first gear wheel arranged contiguous to said rear axle, a link having one end pivotally connected to said securing element and its other end eccentrically connected to said gear wheel, a second gear wheel mounted on said rear axle, and meshing with said first gear wheel, sprockets mounted on said front and rear axles, a pair of endless chains trained over said sprockets, a plurality of spaced parallel bars extending between said pair of chains and secured thereto, a plurality of spaced parallel fingers projecting from each of said bars, a hopper mounted on the front end of said frame for receiving material from said scraper, spaced parallel shafts extending through said hopper and operatively connected to said front axle, and staggered teeth projecting from said shafts.

2. The apparatus as described in claim 1, and further including a hitch extending from the front end of said frame, and a container supported on the rear end of said frame for receiving the roots separated from the soil.

3. In a root separator, a frame including a pair of spaced parallel beams of U-shaped cross section, a front and rear axle journaled in said frame and having wheels thereon, the wheels of the rear axle being of larger diameter than the wheels on the front axle so that the front of the frame is lower than the rear thereof, sprockets mounted on said front and rear axles, endless chains trained over said sprockets, a platform slidably supported by said pair of beams and provided with a plurality of perforations therein, a plurality of spaced parallel bars extending between said pair of chains and secured thereto, a plurality of fingers projecting from each of said bars, arms secured to the rear ends of said beams, a shaft extending between said arms, a container having hooks arranged in engagement with said shaft, a gear wheel mounted on said rear axle, a stub shaft spaced from said rear axle and having a gear wheel thereon meshing with the gear wheel on said rear axle, a link having one end pivotally connected to the gear wheel on said stub shaft, there being a slot in one of said beams, a block arranged contiguous to said slot and pivotally connected to said link, a securing element extending through said slot and connected to said block, a scraper arranged on the front of said frame and extending downwardly therefrom, a hitch connected to the front of said frame and provided with an opening therein, a hopper mounted on the front of said frame and including spaced parallel end walls provided with openings, a pair of spaced parallel shafts extending through the openings in said end walls, teeth secured to said last named shafts, said hopper further including a pair of side walls of less height than said end walls, the bottom of said hopper being open, and gears connecting said last named shafts to said front axle.

References Cited in the file of this patent

UNITED STATES PATENTS

| | | |
|---|---|---|
| 915,110 | Pickel | Mar. 16, 1909 |
| 1,044,860 | Cole | Nov. 19, 1912 |
| 1,853,982 | Kinch | Apr. 12, 1932 |
| 1,880,611 | Vodon | Oct. 4, 1932 |
| 2,110,997 | Mayfield | Mar. 15, 1938 |